United States Patent
Mizuno

(10) Patent No.: US 10,099,603 B2
(45) Date of Patent: Oct. 16, 2018

(54) PITCH ANGLE CALCULATION DEVICE AND OPTICAL AXIS ADJUSTING DEVICE FOR VEHICLES

(71) Applicant: DENSO CORPORATION, Kariya, Aichi-pref. (JP)

(72) Inventor: Ryu Mizuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 29 days.

(21) Appl. No.: 15/304,811

(22) PCT Filed: Apr. 14, 2015

(86) PCT No.: PCT/JP2015/061424
§ 371 (c)(1),
(2) Date: Oct. 17, 2016

(87) PCT Pub. No.: WO2015/159872
PCT Pub. Date: Oct. 22, 2015

(65) Prior Publication Data
US 2017/0043703 A1    Feb. 16, 2017

(30) Foreign Application Priority Data

Apr. 18, 2014  (JP) ................. 2014-086492

(51) Int. Cl.
*B60Q 1/115*   (2006.01)
*B60W 40/11*   (2012.01)
(Continued)

(52) U.S. Cl.
CPC ............. *B60Q 1/115* (2013.01); *B60W 40/11* (2013.01); *G01C 9/02* (2013.01); *G07C 5/00* (2013.01);
(Continued)

(58) Field of Classification Search
CPC ............. B60Q 1/115; B60Q 2300/112; B60Q 2300/132; B60W 40/11; G01C 9/02; G07C 5/00
See application file for complete search history.

(56) References Cited

U.S. PATENT DOCUMENTS 8,838,343 B2 *  9/2014  Kasaba .................... B60Q 1/10
                                                                       701/49
8,905,604 B2 * 12/2014  Kasaba .................... B60Q 1/10
                                                                       315/77
(Continued)

FOREIGN PATENT DOCUMENTS

JP       2001-341578 A    12/2001
JP       2012-96664 A      5/2012
(Continued)

*Primary Examiner* — Alan Cariaso
(74) *Attorney, Agent, or Firm* — Knobbe, Martens, Olson & Bear, LLP

(57) ABSTRACT

A pitch angle calculation device includes a first acceleration acquisition unit that acquires an acceleration Gx in a longitudinal axis (x) direction of a vehicle; a second acceleration acquisition unit that acquires an acceleration Gy in a vertical axis (y) direction of a vehicle; a third acceleration acquisition unit that acquires an acceleration α in an advancement direction of a vehicle; and a pitch angle calculation unit that calculates a pitch angle β formed between the longitudinal axis direction and the vertical axis direction by using the acceleration Gx, the acceleration Gy and the acceleration α.

5 Claims, 7 Drawing Sheets

(51) Int. Cl.
*G01C 9/02* (2006.01)
*G07C 5/00* (2006.01)
(52) U.S. Cl.
CPC .. *B60Q 2300/112* (2013.01); *B60Q 2300/132* (2013.01)

(56) References Cited

U.S. PATENT DOCUMENTS

2004/0125608 A1 7/2004 Izawa
2015/0088455 A1* 3/2015 Yamashita ............... G01C 9/08
 702/155

FOREIGN PATENT DOCUMENTS

| JP | 2013-129284 | 7/2013 |
|---|---|---|
| WO | 2014/020647 A1 | 2/2014 |

* cited by examiner

FIG.5

| | SLOPING ROAD | | | | FLAT ROAD | | |
|---|---|---|---|---|---|---|---|
| | $\gamma$ | $\beta s$ | $\gamma$ | $\gamma$ | $\gamma$ | $\beta s$ | $\delta$ |
| ACCELERATED/DECELERATED STATE | X | S | T | X' | S | O |
| CONSTANT-SPEED TRAVELLING STATE | O | S | T' | O | O | S | O |
| STOPPED STATE | O | S | T" | O | O | S | O |

PITCH ANGLE CALCULATION DEVICE AND OPTICAL AXIS ADJUSTING DEVICE FOR VEHICLES

CROSS-REFERENCE TO RELATED APPLICATION

This application is based on and claims the benefit of priority from earlier Japanese Patent Application No. 2014-86492 filed Apr. 18, 2014, the description of which is incorporated herein by reference.

BACKGROUND OF THE INVENTION

Technical Field

The present disclosure relates to a pitch angle calculation device and an optical axis adjusting device for vehicles.

Background Art

During vehicle traveling, a change in a pitch angle of the vehicle causes a change in an optical axis direction of the headlamp due to acceleration/deceleration and luggage loading. In a method based on conventional art used for solving this problem, a pitch angle is detected and an optical axis direction of the headlamp is adjusted according to the detected pitch angle.

A method of detecting a pitch angle uses, as a basis, information from a vehicle height sensor mounted near a suspension of a wheel. However, this method involves the use of the vehicle height sensor, and causes problems of cost increase and the like.

As a method of detecting a pitch angle without using the vehicle height sensor, JP-A-2013-129284 proposes a pitch angle calculation method. In this method, acceleration in an advancement direction of a vehicle and acceleration in a longitudinal axis direction of a vehicle are detected, and these detected values are applied to a predetermined equation, thereby calculating a pitch angle.

CITATION LIST

Patent Literature

PTL 1: JP-A-2013-129284

In the method disclosed in JP-A-2013-129284, only a pitch angle of a horizontal road surface is directly calculated. When a road surface is inclined, a memory means stores an inclination angle of the inclined road surface in advance, and then the inclination angle needs to be subtracted from or added to the calculated pitch angle.

SUMMARY

Hence it is desired to provide a pitch angle calculation device and an optical axis adjusting device capable of solving problems as set forth above.

The pitch angle calculation device according to the present disclosure is provided with a first acceleration acquisition unit that acquires an acceleration Gx in a longitudinal axis direction of a vehicle, a second acceleration acquisition unit that acquires an acceleration Gy in a vertical axis direction of a vehicle, a third acceleration acquisition unit that acquires an acceleration $\alpha$ in an advancement direction of a vehicle and a pitch angle calculation unit that calculates a pitch angle $\beta$ formed between the longitudinal axis direction and the advancement direction of a vehicle by using the accelerations Gx, Gy and $\alpha$.

The pitch angle calculation device according to the present disclosure readily calculates a pitch angle even when a road surface is inclined.

BRIEF DESCRIPTION OF THE DRAWINGS

In the accompanying drawings:

FIG. 5 is a diagram illustrating a relationship of a vehicle traveling condition and a road surface condition, with angle $\gamma$, static component $\beta_s$ and road surface inclination angle $\delta$.

DETAILED DESCRIPTION OF THE PREFERRED EMBODIMENTS

With reference to the drawings, some embodiments of the present disclosure will be described.

First Embodiment

1. Configuration of a Pitch Angle Calculation Device 1

Figure 1:
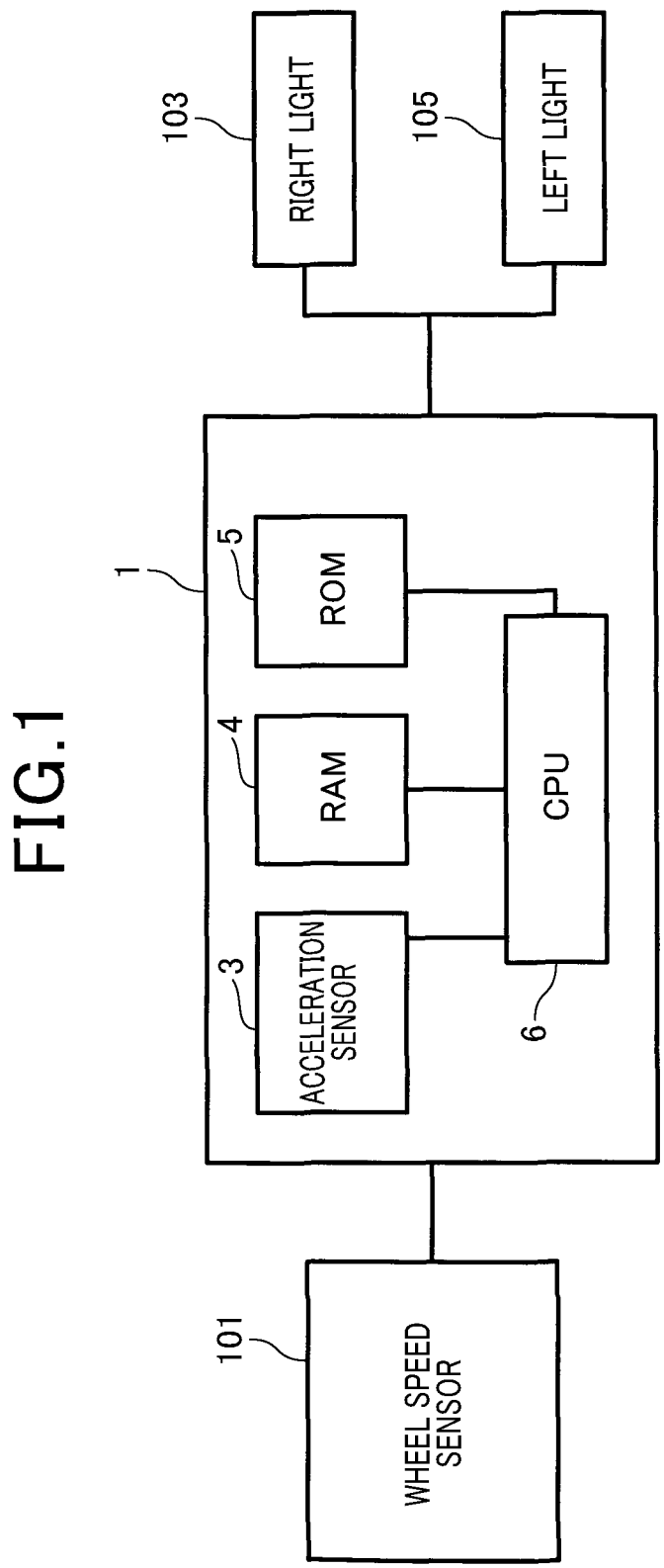
FIG. 1 is a block diagram illustrating a configuration of a pitch angle calculation device 1.
Figure 2:
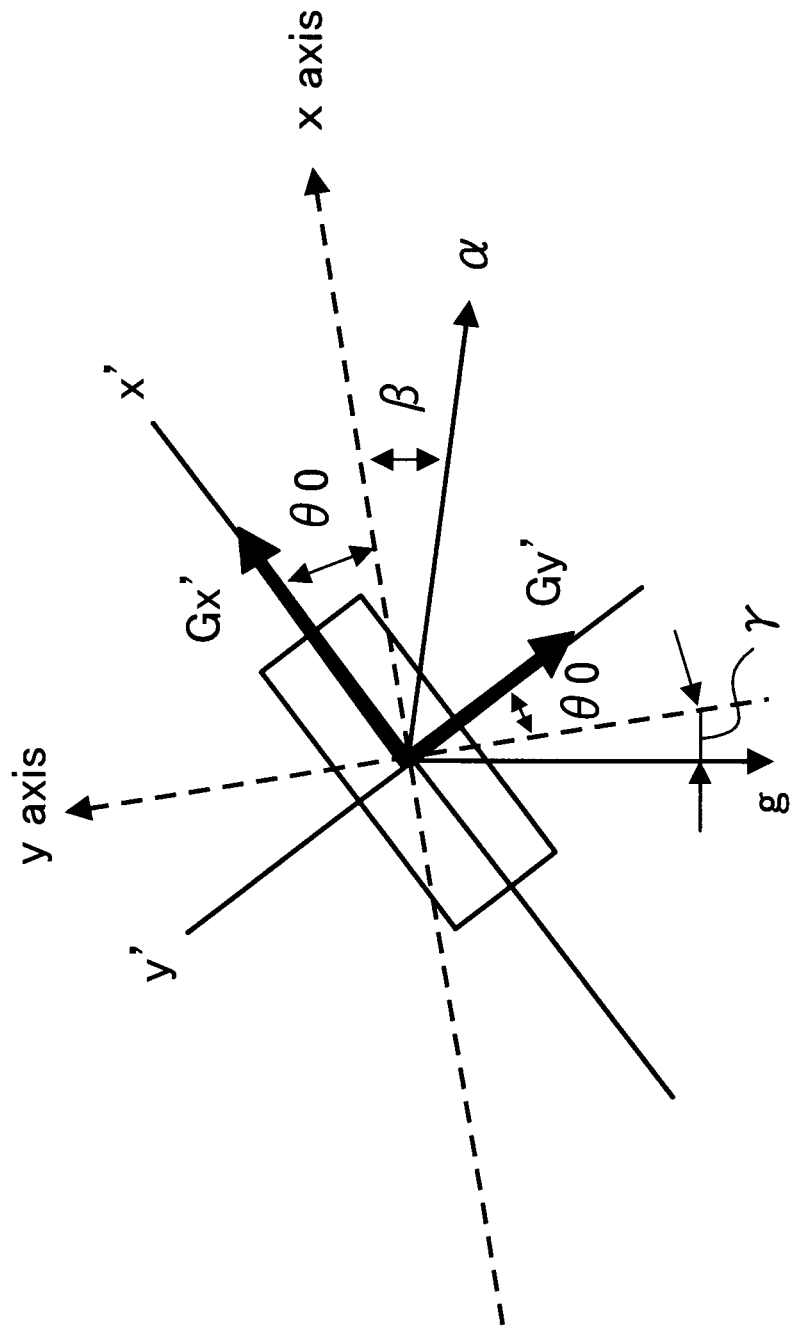
FIG. 2 is a diagram illustrating a configuration of an acceleration sensor 3 and its mounting angle thereof.

With reference to FIGS. 1 and 2, a configuration of a pitch angle calculation device 1 will be described. The pitch angle calculation device 1 is made up of an ECU mounted to a vehicle. The pitch angle calculation device 1 is provided with an acceleration sensor 3, a RAM 4, a ROM 5 and a CPU 6. The ROM 5 stores a control program for executing a process described later.

The pitch angle calculation device 1 can acquire an output signal of a wheel speed sensor 101 detecting a wheel speed of a vehicle. Also, the pitch angle calculation device 1 adjusts an optical axis direction of a right light 103 or a left light 105 on the basis of a pitch angle $\beta$ calculated through a process which will be described later. That is, if the pitch angle $\beta$ changes, the pitch angle calculation device 1 controls the optical axis direction so that the optical axis direction falls within a specified range. Thus, the pitch angle calculation device 1 serves as an optical axis adjustment device.

The acceleration sensor 3 is fixed in a predetermined orientation relative to the vehicle. As shown in FIG. 2, the acceleration sensor 3 can detect an acceleration Gx' in x'-direction and an acceleration Gy' in y'-direction. The x'-direction is in a plane that includes a longitudinal axis x and a vertical axis y of the vehicle, and forms an angle $\theta_0$ (known fixed value) relative to the longitudinal axis x. The longitudinal axis x refers to a direction from the rear toward the front of the vehicle, and is fixed relative to the vehicle (particularly, the vehicle body to which the right light 103 and the left light 105 are mounted). The vertical axis y refers to a direction from the bottom toward the top of the vehicle, and is fixed relative to the vehicle (particularly, the vehicle body to which the right light 103 and a left light 105 are mounted.).

The y'-direction is in the plane that includes the longitudinal axis x and the vertical axis y of the vehicle, and forms the angle $\theta_0$ relative to the vertical axis y. The x'-direction and the y'-direction are orthogonal to each other.

In FIG. 2, α represents an acceleration of the vehicle in an advancement direction, the acceleration being caused by the vehicle traveling. The acceleration α is a direction parallel to the road surface on which the vehicle travels. The pitch angle β calculated by the pitching angle device 1 is an angle formed between the longitudinal axis x and the direction of the acceleration α. γ indicates an angle formed between a vertically downward direction (direction of a gravitational acceleration g) and the vertical axis y.

The acceleration sensor 3 is an example of the first acceleration acquisition unit and the second acceleration acquisition unit. The CPU 6 is an example of the third acceleration acquisition unit, the pitch angle calculation unit, the second angle calculation unit, the specific-state pitch angle calculation unit and the optical axis adjusting unit. The acceleration sensor 3 and the CPU 6 are examples of the first angle calculation unit and the third angle calculation unit.

Figure 3:
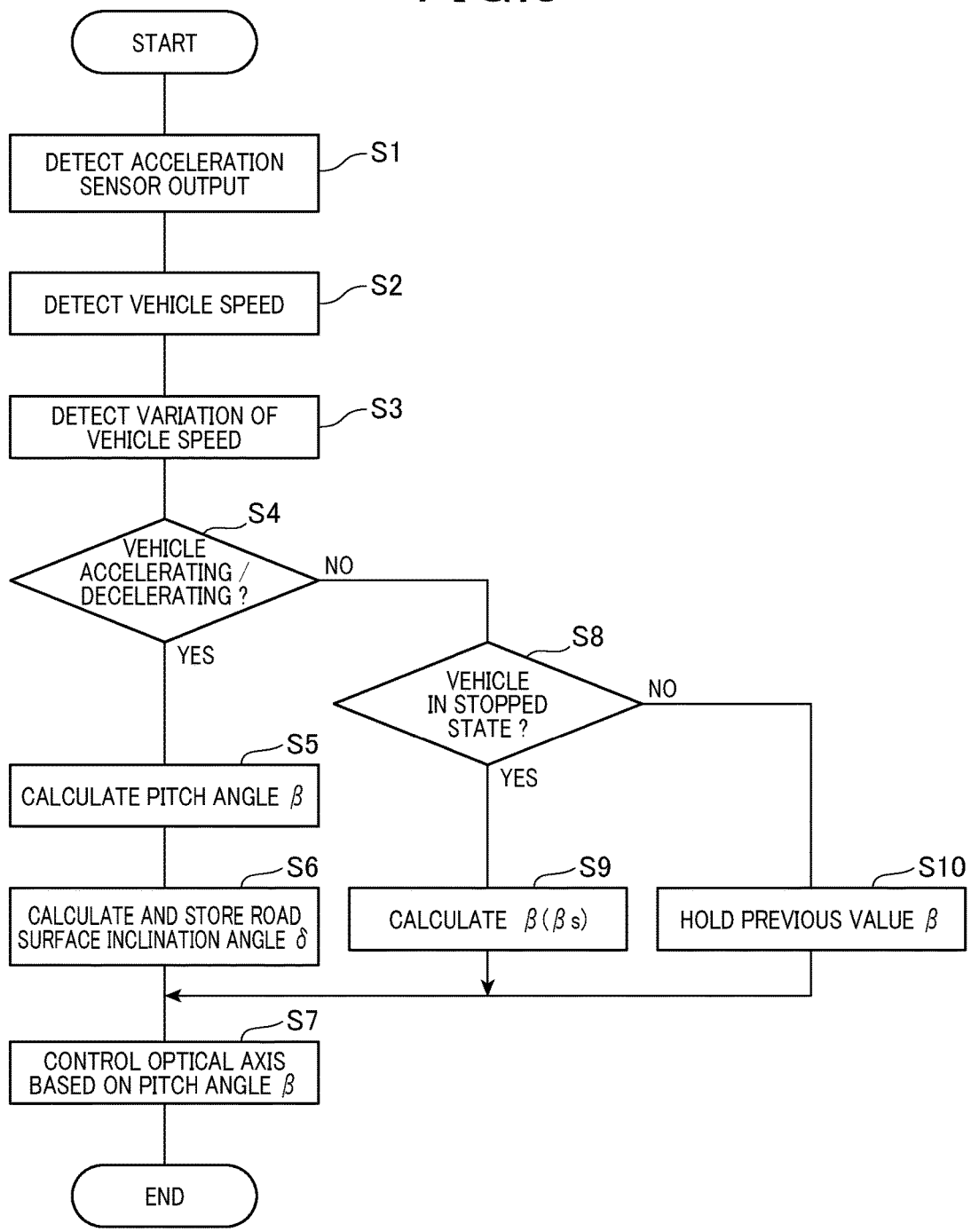
FIG. 3 is a flow diagram illustrating a process executed by the pitch angle calculation device 1.
Figure 4:
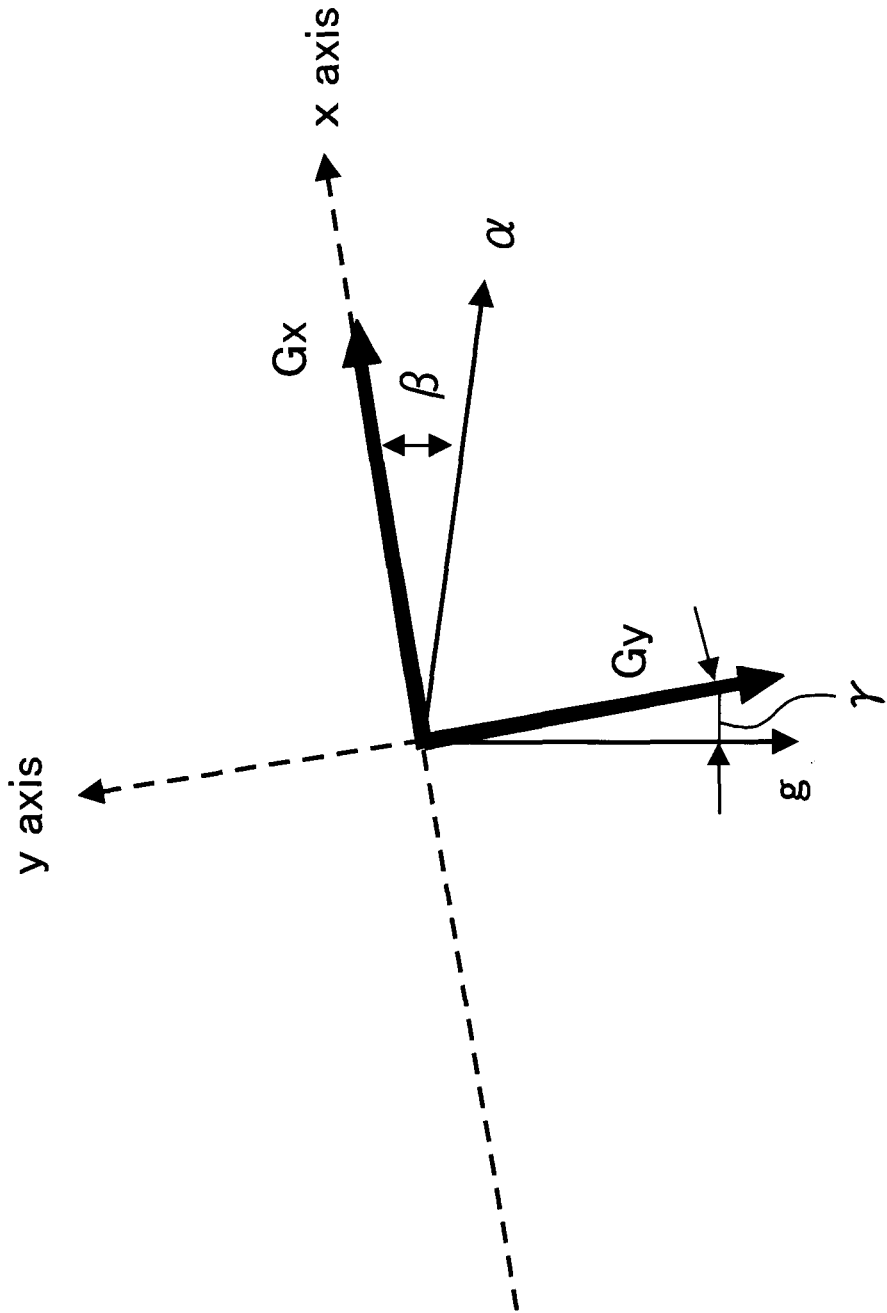
FIG. 4 is a diagram illustrating a relationship between accelerations Gx, Gy, $\alpha$, gravitational acceleration g, pitch angle $\beta$ and angle $\gamma$.

With reference to FIGS. 3 to 5, a process which is cyclically executed by the pitch angle calculation device 1 will be described.

In FIG. 3, in step 1, an acceleration Gx' in the x'-direction and an acceleration Gy' in the y'-direction are detected by using the acceleration sensor 3.

In step 2, a speed of the vehicle is detected on the basis of a signal acquired from a wheel speed sensor 101.

In step 3, variation of the vehicle speed is detected by comparing the vehicle speed detected in preceding step 2 with a vehicle speed detected in the past.

In step 4, it is determined whether the vehicle is accelerating/decelerating. That is, if an absolute value of the vehicle speed variation detected in step 3 exceeds a predetermined threshold, it is determined that the vehicle is accelerating/decelerating, and then control proceeds to step 5. On the other hand, if the absolute value of the vehicle speed variation detected in step 3 is equal to or less than the predetermined threshold, it is determined that the vehicle is not accelerating/decelerating (in a stopped state or constant-speed travelling state), and control proceeds to step 8.

In step 5, the pitch angle β is calculated as follows. Since the longitudinal axis x and the vertical axis y have positional relationship with the x'-direction and the y'-direction, respectively, as described above, relationships expressed in Equations 1 and 2 are established between the accelerations Gx, Gy, Gx' and Gy'. The acceleration Gx is the acceleration in the longitudinal axis x-direction, and the acceleration Gy is the acceleration in the vertical axis y'-direction.

[Math. 1]

$$Gx = Gx' \cos(\theta_0) - Gy' \sin(\theta_0) \quad \text{(Equation 1)}$$

$$Gy = Gx' \sin(\theta_0) + Gy' \cos(\theta_0) \quad \text{(Equation 2)}$$

The accelerations Gx and Gy are acquired by substituting the accelerations Gx' and Gy' in Equations 1 and 2.

Then, the acceleration α in the vehicle advancement direction is calculated from the variation of the vehicle speed detected in step 3. Since the directions of the accelerations Gx, Gy and α, and the gravitational acceleration g are as shown in FIG. 4, the following Equations 3 and 4 are established.

[Math. 2]

$$Gx = \alpha \cos(\beta) - g \sin(\gamma) \quad \text{(Equation 3)}$$

$$Gy = \alpha \sin(\beta) - g \cos(\gamma) \quad \text{(Equation 4)}$$

When Equations 3 and 4 are solved for the pitch angle β and the angle γ. Equations 5 and 6 are obtained.

[Math. 3]

$$\beta = \arcsin((Gx^2+Gy^2+\alpha^2-g^2)/(2\alpha(Gx^2+Gy^2)^{0.5})) - \arcsin(Gx/((Gx/((Gx^2+Gy^2)^{0.5}))) \quad \text{(Equation 5)}$$

$$\gamma = \arcsin((Gx^2+Gy^2+g^2-\alpha^2)/(2g(Gx^2+Gy^2)^{0.5})) - \arcsin(Gx/((Gx^2+Gy^2)^{0.5})) \quad \text{(Equation 6)}$$

The pitch angle β is calculated by substituting the accelerations Gx, Gy and α, as acquired above, in Equation 5. That is, the pitch angle β is calculated by using the accelerations Gx, Gy and α. The calculated pitch angle β is stored in RAM 4. If the pitch angle β has already been stored, it is stored in RAM 4 by overwriting the previous value.

In step 6, an angle δ (hereinafter, referred to as a road surface inclination angle) formed between the road surface on which the vehicle travels and a horizontal plane is calculated and stored as follows. The pitch angle β and the angle γ are represented, respectively, as shown in the equations 7 and 8.

[Math. 4]

$$\beta = \beta d + \beta s \quad \text{(Equation 7)}$$

$$\gamma = \beta d + \beta s + \delta = \beta + \delta \quad \text{(Equation 8)}$$

In Equations 7 and 8, $\beta_d$ is a dynamic component of the pitch angle β which is varied with time due to acceleration/deceleration of the vehicle. In Equations 7 and 8, $\beta_s$ is a static component of the pitch angle β, or a pitch angle of the vehicle in a stopped state or constant-speed travelling state.

Therefore, the road surface inclination angle δ is calculated by subtracting the pitch angle β from the angle γ. The angle γ is calculated by substituting the accelerations Gx, Gy and α into Equation 6. That is, the angle γ is calculated by using the accelerations Gx, Gy and α.

The calculated road surface inclination angle δ is stored in RAM 4. If the road surface inclination angle δ has already been stored, it is overwritten in the RAM 4.

Figure 6:
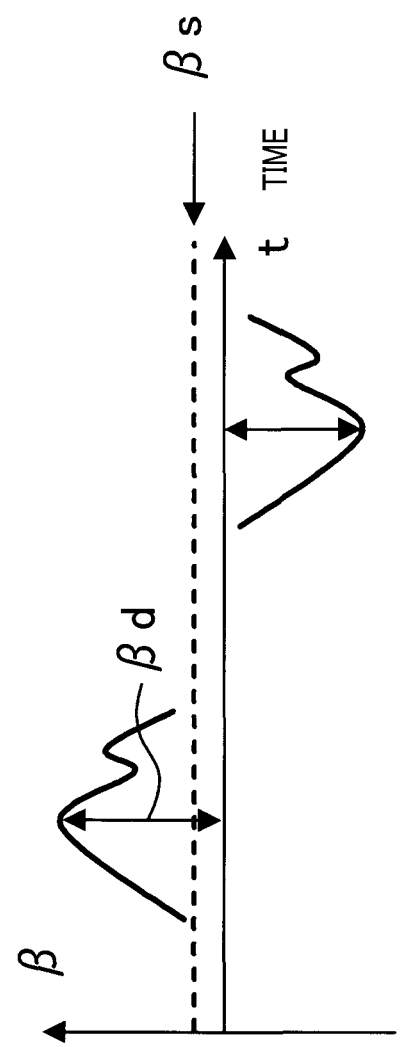
FIG. 6 is a diagram illustrating pitch angle $\beta$, dynamic component $\beta_d$ and static component $\beta_s$.

The angle γ, static component $\beta_s$, and road surface inclination angle δ are varied according to the vehicle traveling conditions (accelerated/decelerated state, constant-speed travelling state or stopped state) and the road surface conditions (sloping road or flat road), as shown in FIG. 5. In FIG. 5, X, X', S, T, T' and T'' refer to a value which can be a non-zero value. The pitch angle β, dynamic component $\beta_d$ and static component $\beta_s$ are expressed as shown in FIG. 6.

In step 7, the optical axis direction of the right light 103 and the left light 105 are adjusted by using the pitch angle β calculated in any one of step 6 described above, and steps 9 and 10 described later.

On the other hand, in step 4, if a negative determination is made in step 4, control proceeds to step 8. It is determined whether or not the vehicle is in a stopped state on the basis of the speed of the vehicle detected in step 2. If the vehicle is in a stopped state, control proceeds to step 9. If the vehicle is not in a stopped state, (that is, in a constant-speed travelling state,) control proceeds to step 10.

In step 9, the pitch angle β of the vehicle in a stopped state is calculated as follows. First, the angle ε formed between the longitudinal axis x-direction and a horizontal plane is calculated. Since the relationship of Equation 9 is established among the angle ε, the accelerations Gx and Gy, the angle ε is calculated by substituting the accelerations Gx and Gy which are calculated in the same method with step 5 into Equation 9.

[Math. 5]

$$\varepsilon = \arctan(Gx/Gy) \quad \text{(Equation 9)}$$

Figure 7:
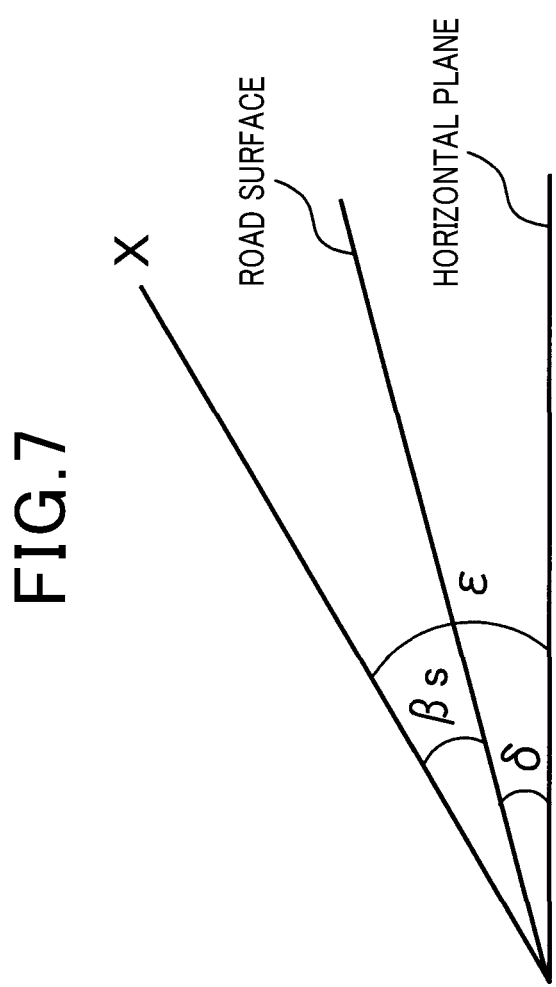
FIG. 7 is a diagram illustrating a relationship between static component $\beta_s$, angle $\varepsilon$, and road surface inclination angle $\delta$.

If the vehicle is in a stopped state or constant-speed travelling state, the static component $\beta_s$, the angle $\varepsilon$ and the road surface inclination angle $\delta$ will be illustrated as shown in FIG. 7, and the relationship expressed of the following Equation 10 is established among them.

[Math. 6]

$$\beta s = \varepsilon - \delta \quad \text{(Equation 10)}$$

The static component $\beta_s$ is calculated by substituting the calculated angle $\varepsilon$ and the latest road surface inclination angle $\delta$ stored in step 6 into Equation 10. Since the dynamic component $\beta_d$ is zero while the vehicle is in a stopped state, the static component $\beta_s$ will be equal to the pitch angle $\beta$. Therefore, the calculated static component $\beta_s$ will be the pitch angle $\beta$ of the vehicle in a stopped state. The calculated pitch angle $\beta$ is stored in RAM 4. If the pitch angle $\beta$ has already been stored, it is stored therein with overwriting. After step 9, control proceeds to step 7. In step 7, the optical axis direction of the right light 103 and the left light 105 are adjusted by using the pitch angle $\beta$ calculated in step 9.

If a negative determination is made in step 8, control proceeds to step 10. In step 10, the latest pitch angle $\beta$ stored in RAM 4 in step 5 is read. After step 10, control proceeds to step 7. In step 7, the optical axis direction of the right light 103 and the left light 105 are adjusted by using the pitch angle $\beta$ read in step 10.

3. Advantageous Effects Provided by the Pitch Angle Calculation Device 1

(1) The pitch angle calculation device 1 calculates the pitch angle $\beta$ readily even when a road surface is inclined.

(2) The pitch angle calculation device 1 calculates the pitch angle $\beta$ even if the vehicle is in a stopped state. For example, in the deceleration which is the state right before the stopped state, the road surface inclination angle $\delta$ is calculated and stored by executing steps 5 and 6, and then, in a stopped state, the pitch angle $\beta$ (the static component $\beta_s$) is calculated by executing step 9 on the basis of the stored road surface inclination angle $\delta$.

(3) With the pitch angle calculation device 1, the pitch angle $\beta$ is calculated without using a vehicle height sensor.

Other Embodiments (1) The pitch angle calculation device 1 calculates the dynamic component $\beta_d$ by substituting the acceleration $\alpha$ into a function which defines the relationship between the acceleration $\alpha$ and the dynamic component $\beta_d$. As the function, for example, the function as shown in Equation 11 is included. In Equation 11, K is a constant.

[Math. 7]

$$\beta d = K \times \alpha \quad \text{(Equation 11)}$$

The pitch angle calculation device 1 calculates the static component $\beta_s$ by substituting the pitch angle $\beta$ and the dynamic component $\beta_d$ calculated by using Equation 11 into Equation 7.

The static component $\beta_s$ is repeatedly calculated as described above by the pitch angle calculation device 1 during every acceleration/deceleration, and stored in RAM 4. The stored static component $\beta_s$ (i.e. the pitch angle $\beta$ of the vehicle in a stopped state or constant-speed travelling state) can be used for controlling the optical axis in a stopped state or constant-speed travelling state.

(2) The acceleration $\alpha$ may be calculated in another way by the pitch angle calculation device 1.

For example, the acceleration $\alpha$ may be measured by an acceleration sensor capable of measuring an acceleration in an advancement direction of the vehicle. Also, the acceleration $\alpha$ may be calculated on the basis of the change of the position by continuously acquiring the positional information of the vehicle.

(3) The an angle $\theta_0$ may be zero or more.

(4) Since the x'-direction and the y'-direction do not have to be necessarily orthogonal to each other, an acute angle or obtuse angle may be formed therebetween.

(5) The pitch angle calculation device 1 may be provided with the acceleration sensor for detecting the acceleration Gx' and the acceleration sensor for detecting the acceleration Gy'.

(6) The acceleration sensor 3 may be provided outside the pitch angle calculation device 1, and output a detection signal to the pitch angle calculation device 1.

REFERENCE SIGNS LIST

1: Pitch angle calculation device
3: Acceleration sensor
4: RAM
5: ROM
6: CPU
101: Wheel speed sensor
103: Right light
105: Left light

The invention claimed is:
1. A pitch angle calculation device comprising:
a first acceleration acquisition unit that acquires an acceleration Gx in a longitudinal axis (x)-direction of a vehicle;
a second acceleration acquisition unit that acquires an acceleration Gy in a vertical axis (y)-direction of the vehicle;
a third acceleration acquisition unit that acquires an acceleration $\alpha$ in an advancement direction of the vehicle;
a pitch angle calculation unit that calculates a pitch angle $\beta$ formed between the longitudinal axis direction and the advancement direction of the vehicle by using the acceleration Gx, the acceleration Gy and the acceleration $\alpha$;
a first angle calculation unit that calculates an angle $\gamma$ formed between the vertical axis direction and a vertical direction by using the acceleration Gx, the acceleration Gy and the acceleration $\alpha$;
a second angle calculation unit that calculates a road surface inclination angle $\delta$ by using the pitch angle $\beta$ and the angle $\gamma$;
a third angle calculation unit that calculates an angle $\varepsilon$ formed between the longitudinal axis direction and a horizontal plane by using the acceleration Gx and the acceleration Gy;
a specific-state pitch angle calculation device unit that calculates a static component $\beta_s$ which is the pitch angle $\beta$ of the vehicle in a stopped state or in a constant-speed travelling state by using the road surface inclination angle $\delta$ and the angle $\varepsilon$;
a dynamic component calculation unit that calculates a dynamic component $\beta_d$ of the pitch angle $\beta$, the dynamic component being varied with time due to acceleration/deceleration of the vehicle; and
a static component calculation unit that calculates the static component by subtracting the dynamic component $\beta_d$ from the pitch angle $\beta$.

2. The pitch angle calculation device according to claim 1, wherein
the device calculates and stores the road surface inclination angle $\delta$ by using the first angle calculation unit and the second angle calculation unit, when the vehicle is in a decelerating state; and
the device calculates the static component $\beta_s$ by using the specific-state pitch angle calculation unit on the basis of the angle $\varepsilon$ and the road surface inclination angle $\delta$ stored during the deceleration, when the vehicle is in a stopped state after the deceleration.

3. The pitch angle calculation device according to claim 1, wherein the dynamic component calculation unit calculates the dynamic component $\beta_d$ by substituting the acceleration $\alpha$ into a function which defines a relationship between the acceleration $\alpha$ and the dynamic component $\beta_d$.

4. The pitch angle calculation device according to claim 1, wherein the device includes an optical axis direction adjusting unit that adjusts an optical axis of a headlamp of the vehicle on the basis of the pitch angle $\beta$.

5. An optical axis adjusting comprising:
a pitch angle calculation device including:
a first acceleration acquisition unit that acquires an acceleration Gx in a longitudinal axis (x)-direction of a vehicle;
a second acceleration acquisition unit that acquires an acceleration Gy in a vertical axis (y)-direction of the vehicle;
a third acceleration acquisition unit that acquires an acceleration $\alpha$ in an advancement direction of the vehicle;
a pitch angle calculation unit that calculates a pitch angle $\beta$ formed between the longitudinal axis direction and the advancement direction of the vehicle by using the acceleration Gx, the acceleration Gy and the acceleration $\alpha$;
a first angle calculation unit that calculates an angle $\gamma$ formed between the vertical axis direction and a vertical direction by using the acceleration Gx, the acceleration Gy and the acceleration $\alpha$;
a second angle calculation unit that calculates a road surface inclination angle $\delta$ by using the pitch angle $\beta$ and the angle $\gamma$;
a third angle calculation unit that calculates an angle $\varepsilon$ formed between the longitudinal axis direction and a horizontal plane by using the acceleration Gx and the acceleration Gy; and
a specific-state pitch angle calculation device unit that calculates a static component $\beta_s$ which is the pitch angle $\beta$ of the vehicle in a stopped state or in a constant-speed travelling state by using the road surface inclination angle $\delta$ and the angle $\varepsilon$;
an optical axis adjusting unit that adjusts an optical axis direction of a headlamp of the vehicle on the basis of the pitch angle $\beta$ calculated by the pitch angle calculation device,
a dynamic component calculation unit that calculates a dynamic component $\beta_d$ of the pitch angle $\beta$, the dynamic component being varied with time due to acceleration/deceleration of the vehicle; and
a static component calculation unit that calculates the static component by subtracting the dynamic component $\beta_d$ from the pitch angle $\beta$.

* * * * *